US008477359B2

(12) United States Patent
Mizumukai

(10) Patent No.: US 8,477,359 B2
(45) Date of Patent: *Jul. 2, 2013

(54) IMAGE PROCESSING APPARATUS FOR ACCESSING A STORAGE MEDIUM ON A SHEET

(75) Inventor: Wataru Mizumukai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 439 days.

This patent is subject to a terminal disclaimer.

(21) Appl. No.: 12/700,213

(22) Filed: Feb. 4, 2010

(65) Prior Publication Data

US 2010/0208309 A1 Aug. 19, 2010

(30) Foreign Application Priority Data

Feb. 18, 2009 (JP) ................................ 2009-034973

(51) Int. Cl.
*G06K 15/00* (2006.01)
*G06F 3/12* (2006.01)

(52) U.S. Cl.
USPC ........................................ 358/1.16; 358/1.15

(58) Field of Classification Search
None
See application file for complete search history.

(56) References Cited

U.S. PATENT DOCUMENTS

| | | | | |
|---|---|---|---|---|
| 8,125,655 | B2 * | 2/2012 | Katsuyama | 358/1.12 |
| 8,289,556 | B2 * | 10/2012 | Tomono | 358/1.15 |
| 2006/0139662 | A1 * | 6/2006 | Sugiyama | 358/1.5 |
| 2007/0014615 | A1 | 1/2007 | Kasayama et al. | |
| 2007/0274753 | A1 | 11/2007 | Muto | |
| 2008/0180710 | A1 | 7/2008 | Muto | |
| 2008/0247794 | A1 | 10/2008 | Muto | |
| 2009/0174893 | A1 * | 7/2009 | Fujii et al. | 358/1.15 |
| 2009/0189770 | A1 | 7/2009 | Wirrig et al. | |
| 2009/0207002 | A1 | 8/2009 | Maruo et al. | |
| 2009/0296140 | A1 * | 12/2009 | Sugiyama et al. | 358/1.15 |

FOREIGN PATENT DOCUMENTS

| | | |
|---|---|---|
| CN | 1818931 A | 8/2006 |
| JP | 2003-140548 | 5/2003 |

(Continued)

OTHER PUBLICATIONS

Decision of Patent Grant dated May 13, 2011 received from the Japanese Patent Office from related Japanese Application No. 2009-034973, together with an English translation.

(Continued)

*Primary Examiner* — Barbara Reinier
(74) *Attorney, Agent, or Firm* — Scully, Scott, Murphy & Presser, PC

(57) ABSTRACT

An image processing apparatus is provided. The image processing apparatus includes: a transport unit configured to transport a sheet; an access unit configured to access a storage medium attached to the sheet transported by the transport unit; a first determination unit configured to determine a length of an access time required for the access unit to complete access from a time when the access is started; and a change unit configured to change control to the transport unit such that a passing time during which a sheet attached with a storage medium transported by the transport unit passes an access range of the access unit increases when the first determination unit determines that the access time is a first length, as compared with the passing time when the first determination unit determines that the access time is a second length shorter than the first length.

23 Claims, 7 Drawing Sheets

FOREIGN PATENT DOCUMENTS

| | | | |
|---|---|---|---|
| JP | 2003-208573 | | 7/2003 |
| JP | 2006-44064 | | 2/2006 |
| JP | A-2006-072101 | | 3/2006 |
| JP | 2006-88478 | | 4/2006 |
| JP | 2006-110802 | | 4/2006 |
| JP | A-2006-173902 | | 6/2006 |
| JP | A-2007-7962 | | 1/2007 |
| JP | A-2007-15820 | | 1/2007 |
| JP | A-2008-305187 | | 12/2008 |
| WO | WO 2006/041193 | A1 | 4/2006 |
| WO | WO 2008/149599 | A1 | 12/2008 |

OTHER PUBLICATIONS

Extended European Search Report dated Feb. 17, 2011.

Japanese Official Action dated Mar. 8, 2011 from related application JP 2009-034973.

Chinese Official Action dated Nov. 1, 2011 from related Application No. 201010114399.8, together with an English-language translation.

Office Action dated Jul. 3, 2012 received from the Chinese Patent Office from related Chinese Application No. 201010114399.8, together with an English-language translation.

* cited by examiner

FIG. 6

321

| AMOUNT OF DATA | SHEET TRANSPORT SPEED |
|---|---|
| ～100KB | V0 |
| 100KB～500KB | V1 |
| 500KB～1MB | V2 |
| 1MB～ | V3 |

FAST ↕ SLOW

FIG. 7

322

| NUMBER OF CORRECTIONS | CORRECTION COEFFICIENT |
|---|---|
| 0 | 1.00 |
| 1 | 0.90 |
| 2 | 0.81 |
| 3 | 0.73 |
| 4 | 0.65 |

FIG. 8

341

| AMOUNT OF DATA | NUMBER OF CORRECTIONS |
|---|---|
| ～100KB | 1 |
| 100KB～500KB | 0 |
| 500KB～1MB | 0 |
| 1MB～ | 2 |

IMAGE PROCESSING APPARATUS FOR ACCESSING A STORAGE MEDIUM ON A SHEET

CROSS-REFERENCE TO RELATED APPLICATION

This application claims priority from Japanese Patent Application No. 2009-034973, filed on Feb. 18, 2009, the entire subject matter of which is incorporated herein by reference.

TECHNICAL FIELD

Aspects of the present invention relate to an image processing apparatus capable of accessing a storage medium such as a Radio Frequency Identification (RFID) tag or the like.

BACKGROUND

A sheet attached with an RFID tag (hereinafter, referred to as "RFID sheet") has been provided. An image processing apparatus which uses an RFID sheet includes an access device capable of accessing an RFID tag, that is, capable of reading information from an RFID tag or writing information to the RFID tag, and accesses the RFID tag while the RFID sheet is being transported during image forming process.

In the image processing apparatus capable of accessing the RFID tag, it can be considered that reading and writing on a RFID tag fails. Therefore, for example, in a related-art image fanning apparatus including a reader/writer for reading and writing on a non-contact IC chip, when reading or writing on the non-contact IC chip cannot be successfully performed, the sheet is reversed and fed again.

However, in the related-art image processing apparatus, even when the RFID sheet is fed again and reading or writing is tried, the reading or writing cannot always be successfully performed. For example, in a case where an access error occurs due to a large amount of data processing being accompanied by processing delay, even when reading or writing is retried under the same condition, it is expected that an error occurs again.

SUMMARY

Accordingly, it is an aspect of the present invention to provide an image processing apparatus capable of reducing an access error to a storage medium.

According to an exemplary embodiment of the present invention, there is provided an image processing apparatus comprising: a transport unit configured to transport a sheet; an access unit configured to access a storage medium attached to the sheet transported by the transport unit; a first determination unit configured to determine a length of an access time required for the access unit to complete access from a time when the access is started; and a change unit configured to change control to the transport unit such that a passing time during which a sheet attached with a storage medium transported by the transport unit passes an access range of the access unit increases when the first determination unit determines that the access time is a first length, as compared with the passing time when the first determination unit determines that the access time is a second length shorter than the first length.

According another exemplary embodiment of the present invention, there is provided an image processing apparatus comprising: an access unit configured to access a storage medium attached to a sheet in an access range; a transport unit configured to transport a sheet to pass through the access range; and a controller corrected to the access unit and the transport unit wherein the controller is configured to determine a length of an access time required for the access unit to complete reading data from the storage medium or writing data to the storage medium, and wherein the controller is configured to control the transport unit to change a passing time in which the sheet passes the access range of the access unit according to the length of the access time.

According to the above configuration, it is possible to realize an image processing apparatus capable of reducing an access error to a storage medium.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 6 shows an example of a database which stores a relationship between the amount of data and a transport speed;

FIG. 7 shows an example of a database which stores a relationship between the number of corrections and a correction coefficient;

FIG. 8 shows an example of a database which stores a relationship between the amount of data and the number of corrections;

DETAILED DESCRIPTION

Hereinafter, an image processing apparatus according to exemplary embodiments of the present invention will be described in detail with reference to the accompanying drawings. In the exemplary embodiments, a multi-function peripheral (MFP) having a function for accessing an RFID tag will be described as an example of the image processing apparatus.

[Overall Configuration of MFP]

Figure 1:
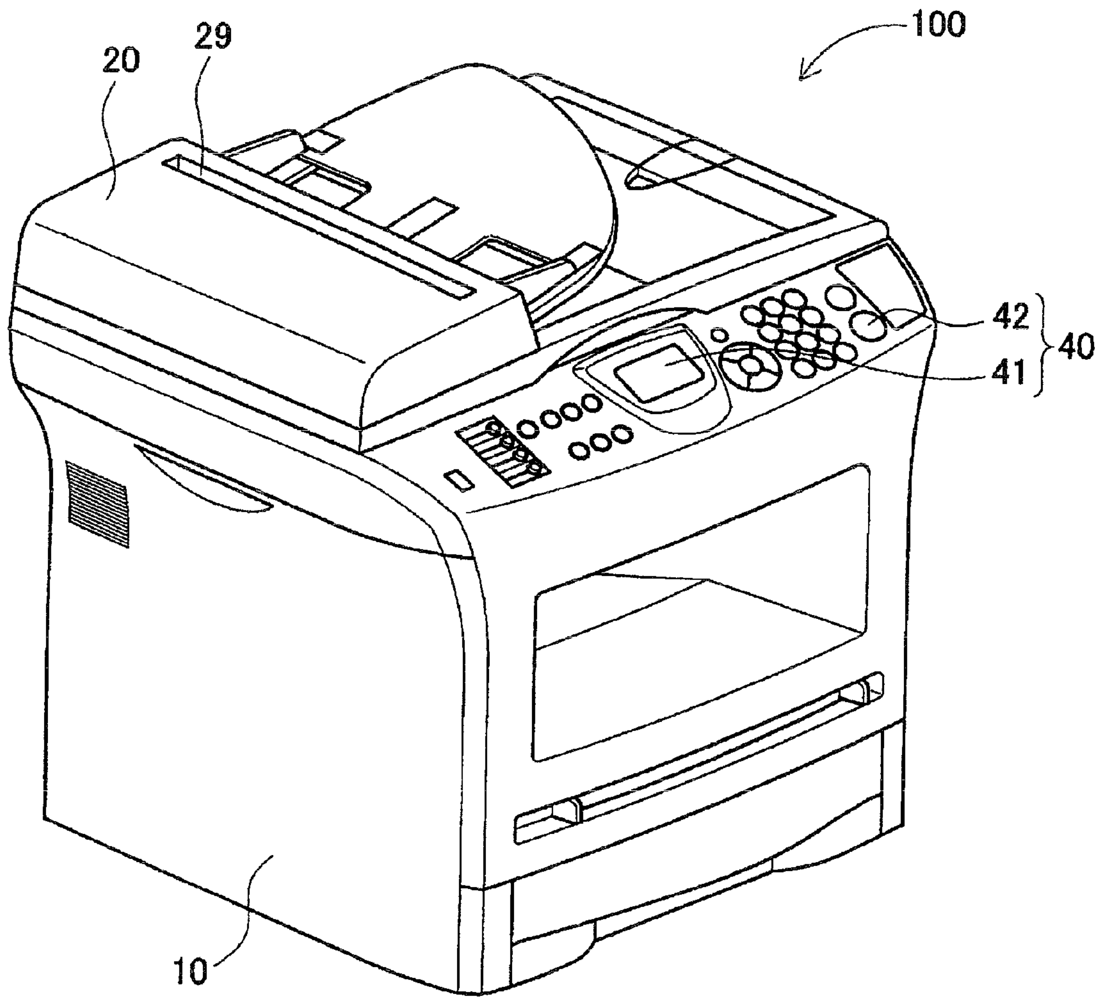
FIG. 1 is a perspective view showing the schematic configuration of a multi-function peripheral according to an exemplary embodiment of the present invention.

As shown in FIG. 1, an MFP 100 according to this exemplary embodiment includes an image forming unit 10 which prints an image on a sheet, and an image reading unit 20 which reads an image of an original document. An operation panel 40 is provided in front of the image reading unit 20. The operation panel 40 includes a display unit 41 having a liquid crystal display, and a button group 42 having a start key, a stop key, a numeric key, and the like. An operation status is displayed on the operation panel 40 and an operation of a user is input through the operation panel 40.

[Configuration of Image Reading Unit]

Figure 2:
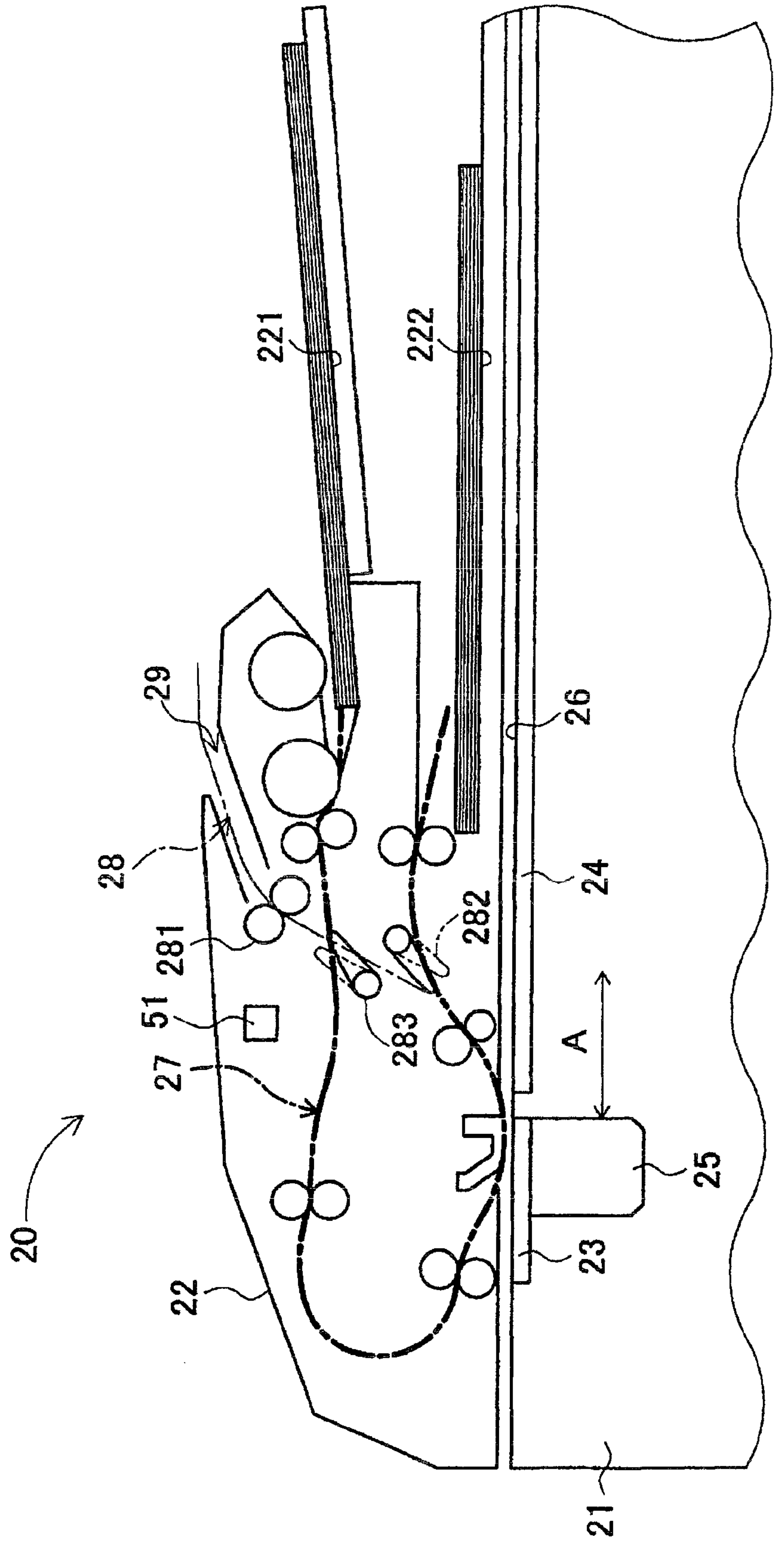
FIG. 2 is a diagram showing the schematic configuration of an image reading unit in the multi-function peripheral according to the exemplary embodiment.

The image reading unit 20 reads an original document and creates image data. Specifically, as shown in FIG. 2, the image reading unit 20 according to this exemplary embodiment includes a scanner unit 21 which reads an image of an original document, and an Automatic Document Feeder (ADF) 22 which automatically transports the original document. The scanner unit 21 includes transparent platen glasses 23 and 24 disposed at the top surface thereof, and an image sensor 25 provided therein.

The ADF 22 includes an original document tray 221 on which an original document before being read placed, and a discharge tray 222 on which the original document after being read is placed. The ADF 22 picks up the original document placed on the original document tray 221 one-by-one, and after the original document is read, discharges the original document onto the discharge tray 222. The ADF 22 also functions as an original document pressing cover which openably covers the upper part of the scanner unit 21 and when an original document is placed on an original document placing plate 26 including the platen glass 24, presses the original document.

As a reading method of an original document, there is provided a flatbed (original document fixed scanning) method and an ADF (original document movable scanning) method. In the case of the flatbed method, an original document is placed on the platen glass 24 (hereinafter, referred to as "FB glass 24") one-by-one. In this state, the image sensor 25 moves in a sub-scanning direction indicated by an arrow A of FIG. 2 (a direction orthogonal to a main scanning direction), and an image of the original document is read in the main scanning direction line-by-line. In the case of the ADF method, an original document is placed on the original document tray 221. Then, the image sensor 25 moves to a position opposing the platen glass 23 (hereinafter, referred to as "ADF glass 23") and is stopped. In this state, the original document is transported to a position (read position) opposing the ADF glass 23, and an image of the original document is read in the main scanning direction line-by-line.

Next, the ADF 22 will be described in detail. A transport path 27 having a substantially U-shape is provided inside the ADF 22. The transport path 27 connects the original document tray 221 and the discharge tray 222. There is provided various rollers along the transport path 27. Specifically, the transport path 27 is configured such that an original document is fed from the original document tray 221 to the ADF 22, U-turned through the various rollers, and transported toward the discharge tray 222 through the ADF glass 23. When the original document passes through the ADF glass 23, an image of the original document is read by the image sensor 25.

A double-face reading mechanism is provided in the ADF 22. The double-face reading mechanism is for reading images on both faces of the original document. A transport path 28 is provided so that, after one face of the original document is read, the original document is reversed and transported again so as to read the image of the other face of the original document. A slit 29 is provided in a case of the ADF 22 for exposing a part of the original document outside the ADF 22 and reversing the original document.

Specifically, a switchback roller 281, a first guide flap 282, and a second guide flap 283 are provided inside the ADF 22 so as to form the transport path 28. That is, the transport path 28 extends from the first guide flap 282 toward the switchback roller 281 through the second guide flap 283.

In the case of double-face reading by the ADF 22, an original document is fed from the original document tray 221 and passes through various rollers, such that an image on one face of the original document is read at a read position. Thereafter, the original document is guided to the transport path 28 by the first guide flap 282, passes through the second guide flap 283, and is transported to the switchback roller 281. The switchback roller 281 reverses the transport direction of the original document. Then, the postures of the first guide flap 282 and the second guide flap 283 are changed. Then, the original document is guided to the transport path 27 again by the second guide flap 283. Thus, the original document is reversed, and an image on the other (rear) face of the original document is read. Thereafter, the original document passes through the first guide flap 282 and is discharged to the discharge tray 222.

The ADF 22 includes a read/write device 51 (hereinafter, referred to as "R/W device 51") which detects an RFID tag within a predetermined range and is capable of reading and writing data from and to the RFID tag within the predetermined range. The R/W device 51 is provided within a range capable of accessing an RFID tag attached to an original document passing through the sheet transport path 27. In other words, a part of the sheet transport path 27 is included in the access range of the R/W device 51. It is noted that the R/W device 51 is provided within a range capable of accessing the original document after being reversed as well as the original document before being reversed. Accordingly, when double-face reading is performed, there are two opportunities to access the RFID tag attached to the original document.

[Configuration of Image Forming Unit]

Figure 3:
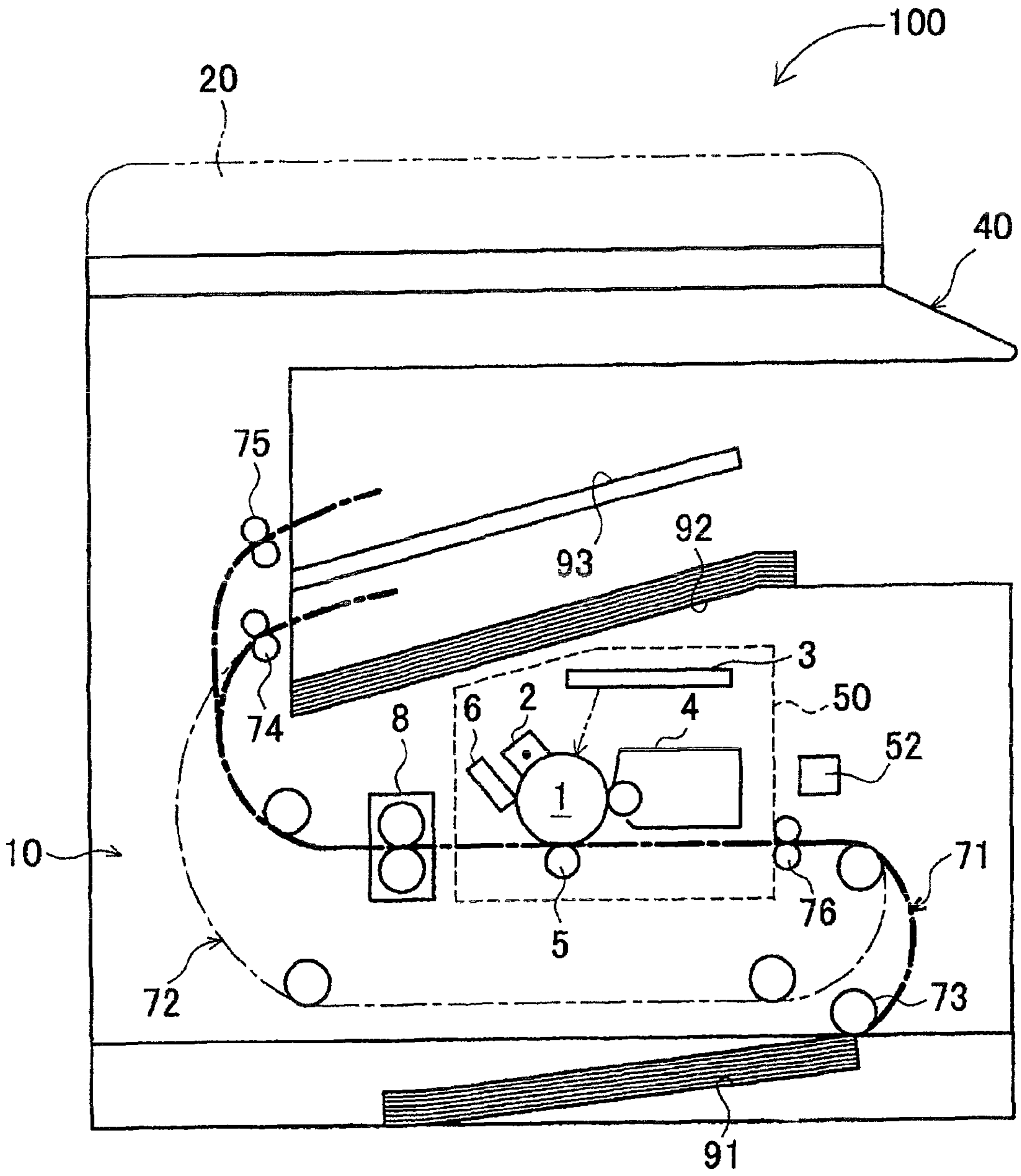
FIG. 3 is a diagram showing the schematic configuration of an image forming unit in the multi-function peripheral according to the exemplary embodiment.

The image forming unit 10 generates an image based on image data transmitted from an information terminal apparatus, such as a personal computer (PC) or the like, or image data of an original document read by the image reading unit 20, and transfers the generated image to a sheet. The image forming unit 10 according to this exemplary embodiment forms an image by a related-art electrophotographic method. As shown in FIG. 3, the image forming unit 10 includes a process unit 50 which forms a toner image, a fixing device 8 which fixes an unfixed toner image, a sheet feed cassette 91 on which sheets before image formation are placed, and discharge trays 92 and 93 on which sheets after image formation are discharged.

The image forming unit 10 includes a transport path 71 having a substantially S-shape which is provided such that a sheet in the sheet feed cassette 91 at the bottom passes through a sheet feed roller 73, a registration roller 76, the process unit 50, and the fixing device 8, and is guided to the upper sheet discharge tray 92 through a sheet discharge roller 74 or to the sheet discharge tray 93 through a sheet discharge roller 75. That is, the image forming unit 10 picks up the sheet placed on the sheet feed cassette 91 one-by-one, transports the sheet to the process unit 50, and transfers a toner image formed in the process unit 50 to the sheet. The sheet to which the toner image is transferred is transported to the fixing device 8, so that the toner image is thermally fixed to the sheet, and thereafter, the sheet is discharged to the sheet discharge tray 92 or the sheet discharge tray 93.

The process unit 50 includes a photosensitive member 1, a charging device 2 which uniformly charges the surface of the photosensitive member 1, an exposure device 3 which exposes the surface of the photosensitive member 1 to light so as to form an electrostatic latent image, a developing device 4 which develops the electrostatic latent image by toner, a transfer device 5 which transfers the toner image on the photosensitive member 1 to a sheet, and a cleaning blade 6 which removes residual toner on the photosensitive member 1.

In the process unit 50, the charging device 2 uniformly charges the surface of the photosensitive member 1. Thereafter, exposure is performed by light from the exposure device 3, and an electrostatic latent image of an image to be formed on the sheet is formed. Next, the developing device 4 supplies toner to the photosensitive member 1. Accordingly, the electrostatic latent image on the photosensitive member 1 is visualized as a toner image.

The image forming unit 10 further includes a double-face print mechanism for printing on both faces of a sheet. A transport path 72 is provided so that, after printing is performed on one face of a sheet, the sheet is reversed and transported again to the process unit 50 for printing on the other face of the sheet.

In the case of double-face printing by the image forming unit 10, a sheet having an image formed on a front face thereof passes through the transport path 71 which is a transport path for the front face printing (forward transport path) and stops at the sheet discharge roller 74 to reverse the transport direction of the sheet. Then, the sheet is transported from the sheet discharge roller 74 to the transport path 72 serving as a re-transport path, passes through a position between the process unit 50 and the sheet feed cassette 91, and is guided to the process unit 50 again. In this manner, the sheet is reversed, and an image is formed on the back face of the sheet.

The image forming unit 10 includes an R/W device 52 which detects an RFID tag within a predetermined range and is capable of reading and writing data from and to the RFID tag within the predetermined range. The R/W device 52 is provided within a range capable of accessing an RFID tag of an RFID sheet passing through the transport path 71. In other words, a part of the transport path 71 is included in the access range of the R/W device 52. It is noted that the R/W device 52 is provided within a range capable of accessing the sheet after being reversed as well as the sheet before being reversed. Accordingly, when double-face printing is performed, there are two opportunities to access the RFID tag attached to the sheet.

[Electrical Configuration of MFP]

Figure 4:
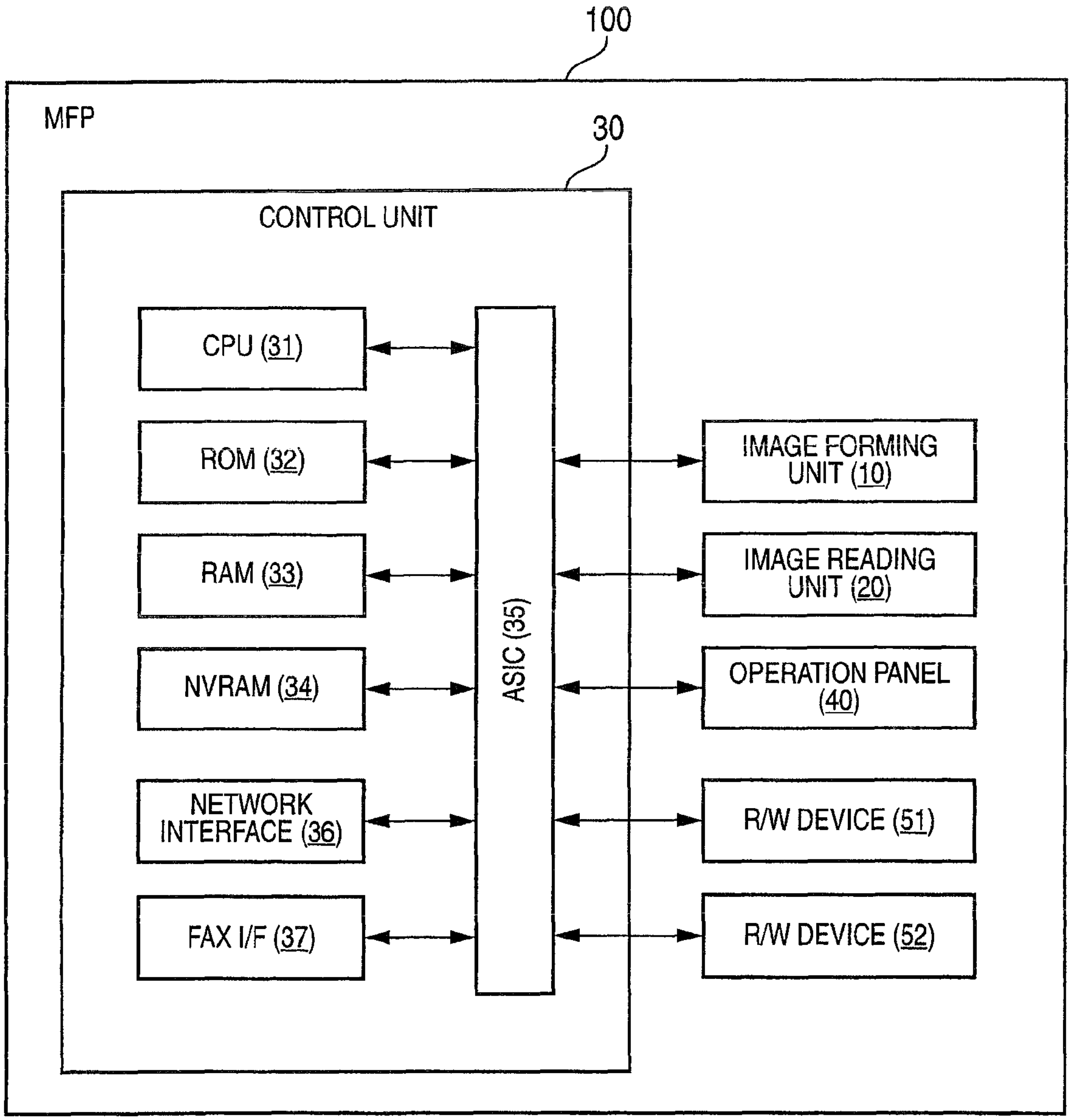
FIG. 4 is a block diagram showing the electrical configuration of the multi-function peripheral according to the exemplary embodiment.

Subsequently, the electrical configuration of the MFP 100 will be described. As shown in FIG. 4, the MFP 100 includes a control unit 30 which includes a Central Processing Unit (CPU) 31, a Read Only Memory (ROM) 32, a Random Access Memory (RAM) 33, a Non-Volatile RAM (NVRAM) 34, an Application Specific Integrated Circuit (ASIC) 35, a network interface 36, and a FAX interface 37.

The CPU 31 executes an arithmetic operation for realizing various functions, such as an image reading function, an image forming function, and the like, in the MFP 100 to act as a control center. The ROM 32 stores various control programs or settings for controlling the MFP 100, initial values, and the like. The RAM 33 is a work area where various control programs are read, or used as a storage area where image data is temporarily stored. The NVRAM 34 is a nonvolatile storage unit and is used as a storage area where various settings and image data are stored.

The CPU 31 controls the respective constituent elements of the MFP 100 (for example, lighting timing of the exposure device constituting the image forming unit 10, drive motors (not shown) of various rollers forming the sheet transport path, and a motor for movement (not shown) of the image sensor unit constituting the image reading unit 20) in accordance with control programs read from the ROM 32 or signals transmitted from various sensors through the ASIC 35 while storing processing results in the RAM 33 or the NVRAM 34.

The network interface 36 is connected to a network, such as Internet or the like, and enables connection to an image processing apparatus, such as a PC or the like. The FAX interface 37 is connected to a telephone line, and enables connection to a FAX device of the other party. A job can be exchanged through the network interface 36 or the FAX interface 37.

[Print Processing]

Figure 5:
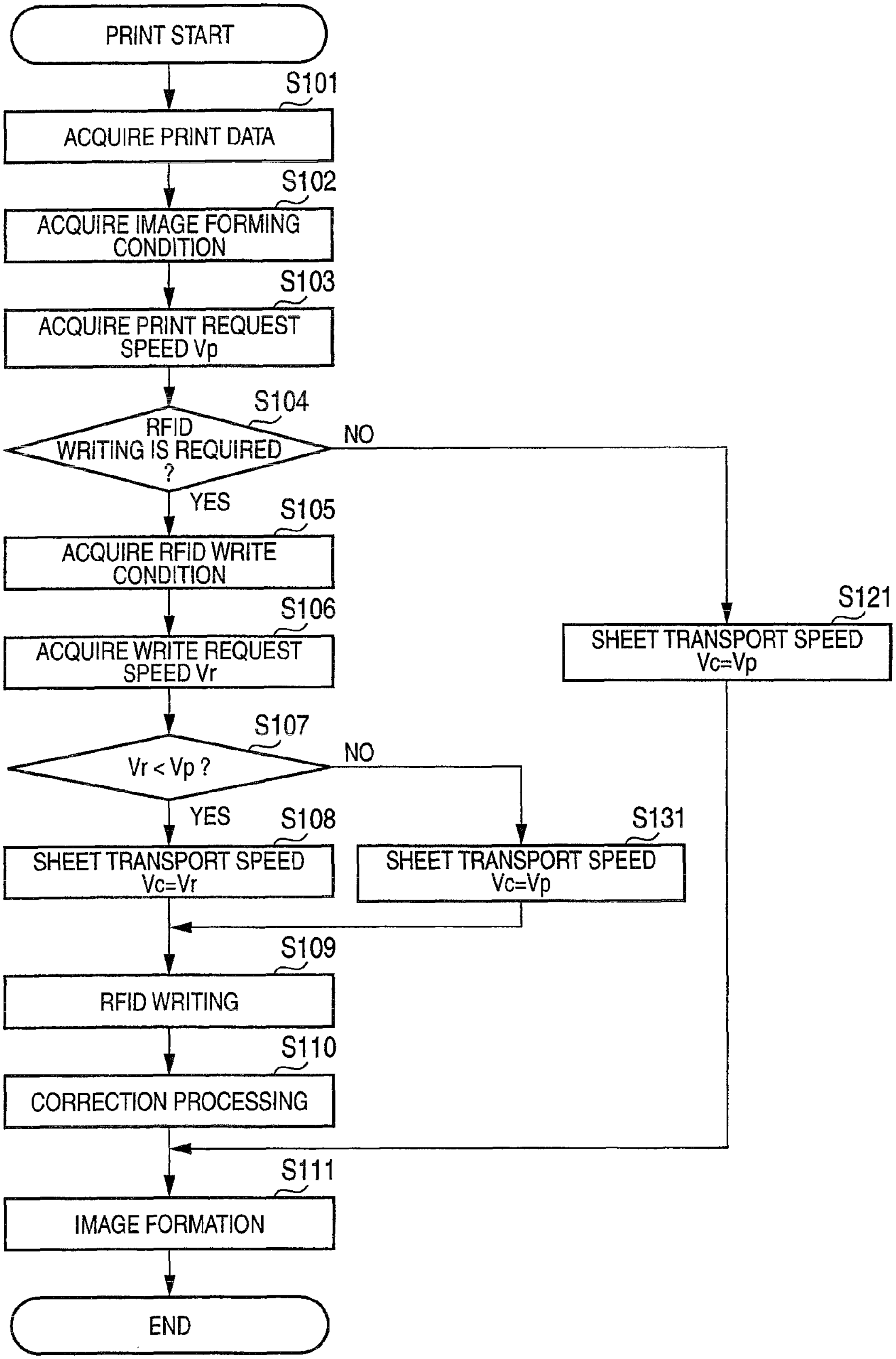
FIG. 5 is a flowchart showing operations of a print processing.

Subsequently, print processing in the MFP 100 will be described with reference to a flowchart of FIG. 5. During this print processing, in addition to image formation on a sheet, data can be written to the RFID tag attached to the sheet. This processing is started in response to a print instruction.

First, image data to be printed and/or data to be written to an RFID tag for a target job are acquired (S101). Image data may be read by the scanner unit 21 of the image reading unit 20 or may be transmitted from a PC or the like. Data to be written to the RFID tag may be read by the R/W device 51 of the image reading unit 20 or may be transmitted from a PC or the like.

Next, an image forming condition of the target job is acquired (S102). The image forming condition refers to various conditions for forming an image on a sheet, such as a sheet type, print quality, and setting of color or monochrome.

Then, a print request speed Vp which is a sheet transport speed required for image formation is acquired based on the image forming condition acquired in S102 (S103). The MFP 100 includes a database which stores a sheet transport speed corresponding to the image forming condition. The MFP 100 acquires an appropriate sheet transport speed in accordance with the image forming condition acquired in S102, and sets a value obtained by multiplying the acquired sheet transport speed by a correction coefficient (described later) as the print request speed Vp. Alternatively, the print request speed may be acquired by an arithmetic operation with the image forming condition acquired in S102 as parameters.

Next, it is determined whether the target job requires writing to the RFID tag (S104). If writing to the RFID tag is not required (S104: NO), the print request speed Vp is set as a sheet transport speed Vc, and the sheet starts to be transported by the sheet transport speed Vc (S121). Thus, the process unit 50 forms an image on the transported sheet (S111), and this process ends.

Meanwhile, if writing to the RFID tag is required (S104: YES), a RFID write condition is acquired (S105). The RFID write condition refers to various conditions for allowing R/W device 52 to write data to the RFID tag, such as communication performance of the R/W device 52 or the RFID tag, and the amount of data to be written.

Next, a write request speed Vr which is a sheet transport speed required for writing to the RFID tag is acquired based on the RFID write condition acquired in S105 (S106). Specifically, in S106, the write request speed Vr is acquired by using at least one from among communication performance of the R/W device 52, communication performance of the RFID tag, and the amount of data to be written.

For example, the MFP 100 includes, in the ROM 32, a database 321, shown in FIG. 6, which stores the relationship between the amount of data and a sheet transport speed required for writing data, and a database 322, as shown in FIG. 7, which stores the relationship between the number of corrections and a correction coefficient. The MFP 100 also includes, in the NVRAM 34, a database 341, shown in FIG. 8, which stores the relationship between the amount of data and the number of corrections. The databases 321 and 322 are stored in advance in the R/W device 52, and the number of corrections is updated in the database 341 during the operation of the MFP 100. At the time of shipment of the MFP 100, the value 0 is stored as the number of corrections.

In order to acquire the write request speed Vr, the sheet transport speed is acquired from the database 321 based on the amount of data to be written acquired in S105. The number of corrections is acquired from the database 341 based on the amount of data to be written acquired in S105, and a correction coefficient is acquired from the database 322 based on the number of corrections. Then, the sheet transport speed and the correction coefficient are multiplied, and the result is set to the write request speed Vr. Alternatively, the write request speed Vr may be acquired by an arithmetic operation with the RFID write condition acquired in S105 as a parameter.

Next, the print request speed Vp acquired in S103 and the write request speed Vr acquired in S106 are compared with each other, and it is determined whether the relationship of Expression (1) is satisfied (S107).

$$Vr<Vp \qquad \text{Expression (1)}$$

When the relationship of Expression (1) is satisfied (S107: YES), the write request speed Vr is set as the sheet transport speed Vc (S108). That is, since the write request speed Vr is slower than the print request speed Vp, if the print request speed Vp were set as the sheet transport speed Vc, a sufficient access time to the RFID tag would not be ensured, and processing delay would occur. Accordingly, the write request speed Vr is set as the sheet transport speed Vc, so that it is possible to ensure a sufficient access time to the RFID tag and avoid processing delay.

In contrast, when the relationship of Expression (1) is not satisfied (S107: NO), the print request speed Vp is set as the sheet transport speed Vc (S131). That is, since the write request speed Vr is faster than the print request speed Vp, even when the print request speed Vp is set as the sheet transport speed Vc, a sufficient access time is ensured. Therefore, the print request speed Vp is set as the sheet transport speed Vc, so that throughput is not deteriorated.

After the sheet transport speed Vc is set in S108 or S131, the RFID sheet starts to be transported by the sheet transport speed Vc, and data starts to be written to the RFID tag (S109). Specifically, when transport of the RFID sheet starts, an access permission signal is transmitted from the R/W device 52, and if the RFID sheet enters the access range of the R/W device 52, the RFID tag transmits a response signal to the access permission signal. Data starts to be written to the RFID tag starts in response to the response signal being received.

After data starts to be written to the RFID tag, correction processing is performed to update the correction coefficient used when the write request speed Vr is acquired in S106 (S111). After the correction processing, the process unit 50 forms an image on the sheet (S111), and this process ends.

Figure 9:
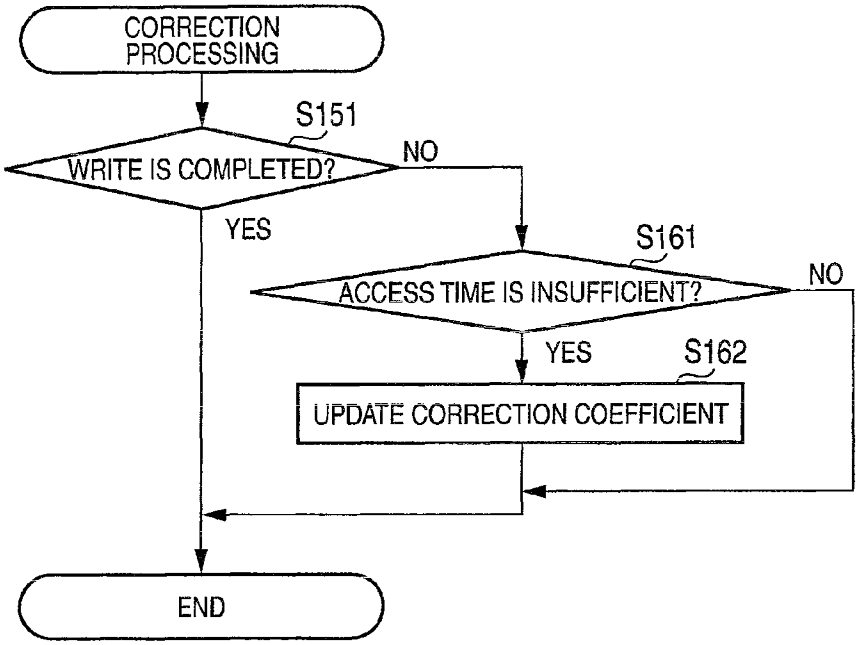
FIG. 9 is a flowchart showing operations of correction processing.

FIG. 9 is a flowchart showing operations of the correction processing in S110. First, it is determined in S109 whether writing of all data to be written is completed (S151). The determination of writing completion is made based on whether a completion signal transmitted from the RFID tag when writing is completed is received. When writing is completed (S151: YES), the correction coefficient is not updated, and this correction processing ends.

When writing is not completed (S151: NO), it is determined whether the cause why writing is not completed is that the access time required for access completion from a time when access to an RFID tag is started is insufficient (S161). The determination of insufficient access time is made based on whether a completion signal transmitted from the RFID tag is received within a predetermined time. For example, when a communication error occurs, an error signal transmitted from the RFID tag may be received. Further, when an RFID tag is out of order, there is no response to a write permission signal from the beginning. Accordingly, it is possible to distinguish between insufficient access time and other errors.

When it is determined that the cause is insufficient access time (S161: YES), the correction coefficient is updated (S162). Specifically, the number of corrections corresponding to the amount of data, which has failed to be written, in the database 341 shown in FIG. 8 is incremented by 1. As shown in FIG. 7, the correction coefficient is set so as to decrease as the number of corrections increases. That is, since the number of corrections is incremented, when the same amount of data is written to an RFID tag from the next time, the correction coefficient becomes smaller than the previous time. Therefore, the write request speed Vr becomes slow. That is, a longer access time is ensured. Accordingly, when the same amount of data is written next, it can be expected that writing to the RFID tag is likely to be completed.

When it is determined that the cause is insufficient RFID tag capacity, communication failure, or RFID tag breakage other than insufficient access time (S161: NO), even when the access time increases, it cannot be expected that writing to the RFID tag is completed. Therefore, the correction coefficient is not updated, and this correction processing ends.

Figure 10:
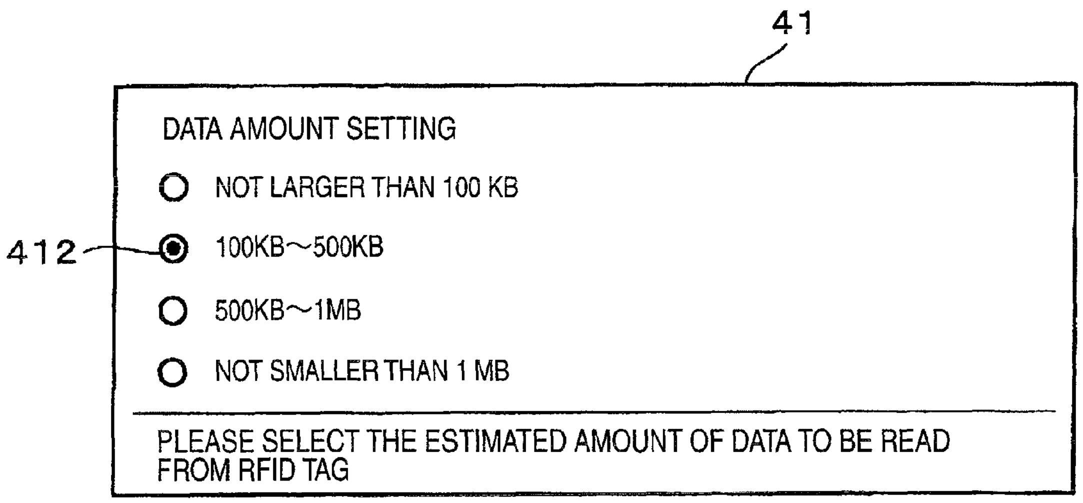
FIG. 10 is a diagram showing an example of a setting screen of the estimated amount of data when data is read from an RFID tag.

In the above-described exemplary embodiment, the sheet transport speed Vc is adjusted in writing data to an RFID tag. However, the inventive concept of the present invention may be applied to data reading. For example, when data of an RFID tag attached to an original document is read by the R/W device 51 while the original document is read by the image reading unit 20, before the original document starts to be transported, a read request speed which is an original document transport speed required for reading the original document and a readout request speed which is an original document transport speed required for reading data from an RFID tag are acquired. The read request speed can be acquired by allowing a user to select an estimated amount of data in advance, for example, on a setting screen shown in FIG. 10 and determining the original document transport speed corresponding to the amount of data. Then, similarly to the processing subsequent to S107, the read request speed and the readout request speed are compared with each other, and the original document transport speed is set. Accordingly, similarly to the writing, the access time to the RFID tag can be ensured, and processing delay can be avoided.

The MFP 100 can perform double-face printing and double-face reading, and when double-face processing is selected, there are two opportunities to access an RFID tag. Therefore, if writing to or reading from an RFID tag can be performed dividedly by two times, the write request speed Vr may be acquired based on the divided amount of data. That is, transport control may be changed while taking the number of times of access into account.

In the above-described exemplary embodiment, the MFP 100 acquires the image forming condition and the print request speed Vp. The MFP 100 also acquires the write condition to the RFID tag and the write request speed Vr. Then, before access to the RFID tag, it is determined whether the relationship Vr<Vp is satisfied. That is, it is determined whether the access time is ensured by comparison of the print request speed Vp with the write request speed Vr. The fact that the access time is not ensured means that the access time is long, and comparison between Vp and Vr can be also understood as determination of the length of the access time. When it is determined that the access time is long, the write request speed Vr is set as the sheet transport speed Vc, that is, transport control is changed such that a passing time during which a sheet attached with the RFID tag passes the access range of the R/W device 52 increases. In other words, when it is determined that the access time is a first length, the passing time is increased, as compared with the passing time when it is determined that the access time is a second length shorter than the first length. Therefore, the time period for which the R/W device 52 is capable of accessing the RFID tag can be extended, and access failure due to processing delay can be reduced.

In the above-described exemplary embodiment, the MFP 100 stores the number of corrections, which is counted up when writing to an RFID tag is not completed, in the database 341. The amount of change of transport control is determined based on the number of corrections. That is, an access result of a preceding job is stored, and more suitable determination conforming to the actual environment can be made by using the access result for a subsequent job. Since the sheet transport speed becomes slow as the number of corrections increases, access failure can be reduced more reliably.

While the present invention has been shown and described with reference to certain exemplary embodiments thereof, it will be understood by those skilled in the art that various changes in form and details may be made therein without departing from the spirit and scope of the invention as defined by the appended claims.

For example, the present invention is not limited to a multifunction peripheral (MFP) but may be applied to a copy machine, a scanner, a FAX machine, or the like as long as it has an image processing function. The image forming method of the image forming unit is not limited to an electrophotographic method, but an ink jet method may be used. The present invention may be applied to an image forming apparatus which forms a color image or an image forming apparatus which only forms a monochrome image.

In the above-described exemplary embodiment, although the image reading unit 20 and the image forming unit 10 can perform image reading and image formation on both faces together, the present invention is not limited thereto. That is, the present invention may be applied to an apparatus which supports image reading and image formation only on a single face.

In the above-described exemplary embodiment, although a combination of image formation and RFID tag writing or a combination of original document reading and RFID tag reading has been described, the present invention may be applied to a combination of image formation and RFID tag reading or a combination of original document reading and RFID tag writing.

In the above-described exemplary embodiment, although the print request speed Vp and the write request speed Vr are calculated and compared with each other in determination of the length of the access time, the inventive concept of the present invention is not limited thereto. For example, the amount of data at the time of access may be acquired, and when the amount of data is larger than a threshold value, it may be determined that the access time is long. The access time required for access completion may be calculated based on the amount of data or communication ability (communication speed, communication range, or the like), and then whether the length of the access time is long or not may be determined. The actual measurement value of the access time may be stored in association with the amount of data at the time of access, and for a subsequent job, the length of the access time may be determined by using the stored amount of data and the actual measurement value.

In the above-described exemplary embodiment, although the sheet transport speed is decreased so as to increase the passing time during the print processing, the present invention is not limited thereto. For example, similarly to the image forming unit 10, in the case that a sheet is temporarily stopped at the registration roller 76 so as to adjust the transport timing of the sheet, the stop time at the registration roller 76 may be extended. In this case, the stop position at the registration roller 76 is within in the access range of the R/W device 52.

In the above-described exemplary embodiment, image formation on a sheet is performed after writing on an RFID tag, the sequence may be reversed. Further, writing on an RFID tag and image formation on a sheet may be performed in parallel.

The present invention provides illustrative, non-limiting embodiments as follows:

(1) An image processing apparatus comprises: a transport unit configured to transport a sheet; an access unit configured to access a storage medium attached to the sheet transported by the transport unit; a determination unit configured to determine whether a length of an access time required for the access unit to complete access from a time when the access is started is long; and a change unit configured to change control to the transport unit such that a passing time during which a sheet attached with a storage medium transported by the transport unit passes an access range of the access unit increases when the determination unit determines that the access time is long, as compared with the passing time when the determination unit determines that the access time is short.

The image processing apparatus according to (1) has a function for accessing a storage medium (RFID tag or the like) attached to a sheet. The term "sheet" refers to an original document to be read and a sheet to be written. The term "access" refers to reading of information from the storage medium, writing of information to the storage medium, or reading and writing. The image processing apparatus according to (1) determines the length of the access time in accessing the storage medium, and when it is determined that the access time is long, changes transport control such that the passing time increases. The length of the access time can be determined, for example, based on the amount of data at the time of access to the storage medium and communication ability (communication speed, communication range, or the like). That is, the length of the access time may be determined directly by acquiring the access time and determining the length of that time, or may be determined indirectly from the value of an equivalent parameter, such as a sheet transport speed or the like, for determining the length of the access time.

That is, the image processing apparatus according to (1) changes the transport control such that the passing time increases when it is determined that the access time is long. Therefore, the time for which the access unit is capable of actually accessing a storage medium can be extended, and access failure due to processing delay can be reduced. The change of transport control to increase the passing time may include change in a sheet transport speed or change in a waiting time at a registration roller.

(2) In the image processing apparatus of (1), the determination unit may use at least one of the amount of data at the time of access, a communication speed of the storage medium, and a communication speed of the access unit as a determination factor. With the use of the determination factor, more suitable determination can be made. The determination factor may be acquired automatically or manually.

(3) The image processing apparatus of (1) or (2) may further include a storage unit which stores an access result by the access unit as history information in association with the determination factor. The determination unit may determine the length of the access time by using the history information. That is, the access result (for example, presence/absence of access completion and an actual measurement value of the access time) is stored and used at the time of determination for a subsequent sheet. Therefore, more suitable determination conforming to the actual environment can be made.

(4) In the image processing apparatus of any one of (1) to (3), the change unit may change control of the transport unit such that the passing time becomes equal to the access time. With the change of control of the transport unit, a waste of time can be reduced, and throughput can be improved.

(5) The image processing apparatus of any one of (1) to (4) may further include a correction storage unit which stores correction information used when the change unit changes control of the transport unit, and an update unit which, when access to the storage medium is not normally completed, updates the correction information such that the passing time for a subsequent sheet further increases. That is, after change of the transport control, access is not always normally completed. Accordingly, when access has failed, the correction information is updated, and the passing time is extended by using the updated correction information at the time of subsequent transport. As a result, access failure can be reduced more reliably.

(6) The image processing apparatus of (5) may further include a cause determination unit which determines whether the cause for abnormal completion of access by the access unit is an insufficient access time. The update unit may update correction information when it is determined that the cause for abnormal completion is the insufficient access time, and may not update the correction information when it is determined that the cause for abnormal completion is not the insufficient access time. That is, when the cause for abnormal completion is an insufficient storage capacity of the storage medium or the like, change of the transport control would be meaningless. Accordingly, the transport control is executed when the cause for the incomplete access is the insufficient access time, so that a more suitable operation can be achieved. The determination on an insufficient access time may be made based on whether a normal completion signal transmitted from the storage medium is received after access is completed.

(7) In the image processing apparatus of any one of (1) to (6), the transport unit may be able to return a sheet having passed through the access range of the access unit to the access range again, and the change unit may change control of the transport unit according to the number of times, by which the sheet is to be passed through the access range of the access unit. For example, for double-face printing or double-side reading, when a sheet having passed the access range is returned to the access range again, there are a number of opportunities to access the storage medium. Therefore, when access is likely to be completed by divided writing or divided reading with respect to a storage medium even if the transport control is not changed, it might be advantageous that it is determined whether to change the transport control in consideration of the number of times of access, such that transport performance is not wastefully deteriorated.

What is claimed is:

1. An image processing apparatus comprising:

a transport unit configured to transport a sheet;

an access unit configured to access a storage medium attached to the sheet transported by the transport unit;

a controller configured to determine a length of an access time required for the access unit to complete access from a time when the access is started; and a storage unit configured to store an access result by the access unit as history information in association with a determination factor used for determining the length of the access time, wherein the controller determines the length of the access time by using the history information, and wherein the controller is configured to control the transport unit to change a passing time during which the sheet attached with the storage medium passes an access range of the access unit, according to the length of the access time.

2. The image processing apparatus according to claim 1, wherein the controller is configured to use at least one of the amount of data in the access by the access unit, a communication speed of the storage medium, and a communication speed of the access unit, as a determination factor to determine the length of the access time.

3. The image processing apparatus according to claim 1, wherein the controller controls the transport unit such that the passing time is equal to the access time determined by the controller.

4. The image processing apparatus according to claim 1, further comprising:

a correction storage unit configured to store correction information which is used when the controller controls the transport unit to change the passing time, wherein the controller is configured to, when access to the storage medium is not normally completed, update the correction information such that the passing time for a subsequent sheet increases.

5. The image processing apparatus according to claim 4, wherein the controller is configured to determine whether a cause of the abnormal completion of the access by the access unit is that the passing time is insufficient, and wherein the controller is configured to update correction information when the controller determines that the cause is that the passing time is insufficient, and not to update the correction information when the controller determines that the cause is not that the passing time is insufficient.

6. The image processing apparatus according to claim 1, wherein the transport unit is capable of returning the sheet having passed through the access range of the access unit to the access range again, and wherein the controller controls the transport unit according to the number of times the sheet is to be passed through the access range of the access unit.

7. The image processing apparatus according to claim 1, wherein the controller controls the transport unit to increase the passing time when the length of the access time is determined to be a first length, as compared with the passing time when the length of the access time is determined to be a second length shorter than the first length.

8. The image processing apparatus according to claim 1, wherein the controller controls the transport unit to change a transport speed of the sheet to change the passing time.

9. The image processing apparatus according to claim 8, wherein the controller controls the transport unit to decrease the transport speed of the sheet to increase the passing time when the length of the access time is determined to be a first length, as compared with the passing time when the length of the access time is determined to be a second length shorter than the first length.

10. The image processing apparatus according to claim 8, further comprising:

an image forming unit configured to form an image on the sheet transported by the transport unit, wherein the controller determines a print request speed required for an image formation based on an image forming condition, wherein the controller determines an access request speed required for completing the access to the storage medium, and wherein the controller controls the transport unit to change the transport speed of the sheet based on a comparison between the print request speed and the access request speed.

11. An image processing apparatus comprising:

a transport unit configured to transport a sheet;

an access unit configured to access a storage medium attached to the sheet transported by the transport unit; and a controller configured to determine a length of an access time required for the access unit to complete access from a time when the access is started, wherein the controller is configured to control the transport unit to change a passing time during which the sheet attached with the storage medium passes an access range of the access unit, according to the length of the access time, wherein the image processing apparatus further comprises:

a correction storage unit configured to store correction information which is used when the controller controls the transport unit to change the passing time, and wherein the controller is configured to, when access to the storage medium is not normally completed, update the correction information such that the passing time for a subsequent sheet increases.

12. The image processing apparatus according to claim 11, wherein the controller is configured to use at least one of the amount of data in the access by the access unit, a communication speed of the storage medium, and a communication speed of the access unit, as a determination factor to determine the length of the access time.

13. The image processing apparatus according to claim 11, further comprising:

a storage unit configured to store an access result by the access unit as history information in association with a determination factor used for determining the length of the access time, wherein the controller determines the length of the access time by using the history information.

14. The image processing apparatus according to claim 11, wherein the controller controls the transport unit such that the passing time is equal to the access time determined by the controller.

15. The image processing apparatus according to claim 11, wherein the controller is configured to determine whether a cause of the abnormal completion of the access by the access unit is that the passing time is insufficient, and wherein the controller is configured to update correction information when the controller determines that the cause is that the passing time is insufficient, and not to update the correction information when the controller determines that the cause is not that the passing time is insufficient.

16. The image processing apparatus according to claim 11, wherein the transport unit is capable of returning the sheet having passed through the access range of the access unit to the access range again, and wherein the controller controls the transport unit according to the number of times the sheet is to be passed through the access range of the access unit.

17. The image processing apparatus according to claim 11, wherein the controller controls the transport unit to increase the passing time when the length of the access time is determined to be a first length, as compared with the passing time when the length of the access time is determined to be a second length shorter than the first length.

18. The image processing apparatus according to claim 11, wherein the controller controls the transport unit to change a transport speed of the sheet to change the passing time.

19. The image processing apparatus according to claim 18, wherein the controller controls the transport unit to decrease the transport speed of the sheet to increase the passing time when the length of the access time is determined to be a first length, as compared with the passing time when the length of the access time is determined to be a second length shorter than the first length.

20. The image processing apparatus according to claim 18, further comprising:

an image forming unit configured to form an image on the sheet transported by the transport unit, wherein the controller determines a print request speed required for an image formation based on an image forming condition, wherein the controller determines an access request speed required for completing the access to the storage medium, and wherein the controller controls the transport unit to change the transport speed of the sheet based on a comparison between the print request speed and the access request speed.

21. An image processing apparatus comprising:

a transport unit configured to transport a sheet;

an access unit configured to access a storage medium attached to the sheet transported by the transport unit;

a controller configured to determine a length of an access time required for the access unit to complete access from a time when the access is started; and wherein the controller is configured to control the transport unit to change a passing time during which the sheet attached with the storage medium passes an access range of the access unit, according to the length of the access time wherein the transport unit is capable of returning the sheet having passed through the access range of the access unit to the access range again, and wherein the controller controls the transport unit according to the number of times the sheet is to be passed through the access range of the access unit.

22. The image processing apparatus according to claim 1, wherein the length of access time being determined based on a comparison of a print request speed (Vp) and a write request speed (Vr).

23. The image processing apparatus according to claim 22, wherein the passing time is set equal to Vr when Vr is less than Vp and the passing time is set equal to Vp when Vr is not less than Vp.

* * * * *